United States Patent [19]
Yale

[11] Patent Number: 4,713,968
[45] Date of Patent: Dec. 22, 1987

[54] METHOD AND APPARATUS FOR MEASURING THE MECHANICAL ANISOTROPY OF A MATERIAL

[75] Inventor: David P. Yale, Dallas, Tex.

[73] Assignee: Mobil Oil Corporation, New York, N.Y.

[21] Appl. No.: 865,999

[22] Filed: May 22, 1986

[51] Int. Cl.$^4$ .................. G01V 1/40; E21B 49/00
[52] U.S. Cl. ........................ 73/594; 73/152; 73/597; 367/31
[58] Field of Search ........... 73/152, 594, 597, 599, 73/632, 629, 598; 367/31, 30, 13

[56] References Cited

U.S. PATENT DOCUMENTS

| | | | |
|---|---|---|---|
| 3,949,352 | 4/1976 | Vogel | 367/31 |
| 4,080,836 | 3/1978 | Thompson et al. | 73/597 |
| 4,106,327 | 8/1978 | Adler et al. | 73/597 X |
| 4,138,894 | 2/1979 | Robert et al. | 73/625 |
| 4,380,930 | 4/1983 | Podhrasky et al. | 73/594 |
| 4,522,071 | 6/1985 | Thompson | 73/597 |
| 4,631,963 | 12/1986 | Sprunt et al. | 73/594 |
| 4,631,964 | 12/1986 | Sprunt et al. | 73/594 |
| 4,641,520 | 2/1987 | Mao | 73/152 X |

FOREIGN PATENT DOCUMENTS 1152201 8/1983 Canada ................................ 367/31

OTHER PUBLICATIONS

"A New Method for Shear-Wave Logging", Choro Kitsunezaki, *Geophysics*, vol. 45, No. 10 (Oct. 1980), pp. 1489–1506).

J. Szilard, Miscellaneous Testing Problems and Methods, Ultrasonic Testing, John Wiley & Sons Ltd., 1982, pp. 599–625.

N. N. Hsu, Generation . . . Rotatable Transducer, Rev. Sci. Inst., vol. 46, No. 7, Jul. 1975.

*Primary Examiner*—Michael J. Tokar
*Assistant Examiner*—Scott M. Oldham
*Attorney, Agent, or Firm*—Alexander J. McKillop; Michael G. Gilman; George W. Hager, Jr.

[57] ABSTRACT

The azimuthal direction of the mechanical anisotropy of a material is measured by using a first transducer to transmit shear acoustic energy through the material and a second transducer, cross-polarized with respect to the first transducer, to receive the shear acoustic energy after it has traveled through the material. Amplitude and phase of the cross-polarized shear acoustic energy are measured as a function of the azimuthal rotation of the shear acoustic energy transducers with respect to the material.

12 Claims, 9 Drawing Figures

USE OF CROSS-POLARIZED SHEAR WAVE TRANSDUCERS

FIG. 6

METHOD AND APPARATUS FOR MEASURING THE MECHANICAL ANISOTROPY OF A MATERIAL

BACKGROUND OF THE INVENTION

A mechanical property of a given volume of a material can vary depending on the direction of the measurement of such property. Variations in such a mechanical property with azimuth can lead to differences in the patterns of fluid flow through the material and can control the direction of propagation of natural and induced fractures in the material. This variation of mechanical property with azimuthal direction is termed "anisotropy". Such mechanical anisotropy can be caused by near parallel fractures, in-situ stress, depositional patterns, or crystal alignment within the material. Knowledge of mechanical anisotropy is important in identifying stress cracking in brittle materials, fluid flow patterns in porous material and fatigue cracking in metals or ceramics. For example, the anisotropy of elastic properties or anisotropy caused by fractures may affect the interpretation of seismic prospecting data. In petroleum production, permeability anisotropy, caused by preferential arrangement of pores and/or fractures, is often an important factor in both primary and secondary enhanced recovery. Stress anisotropy is important in petroleum well stimulation by hydraulic fracturing because the azimuth of induced fractures is generally parallel to the maximum horizontal stress direction. In many cases, the directions of natural and induced fractures are coincident.

SUMMARY OF THE INVENTION

In accordance with the present invention, there is provided both a method and apparatus for determining the azimuthal direction of the mechanical anisotropy of a material. A first transducer transmits polarized shear acoustic energy through the material and a second transducer, cross-polarized with respect to said first transducer, receives the shear acoustic energy after it has traveled through the material. Relative rotational movement is provided for these transducers with respect to the material. Both the amplitude and phase of the cross-polarized shear acoustic energy are measured as a function of the azimuthal rotation of the shear acoustic transducers with respect to the material. Such amplitude and phase measurements are used to determine the azimuthal direction of the mechanical anisotropy of the material.

A third transducer may be further employed to transmit additional polarized shear acoustic energy through the material along with the first transmitting transducer. This third transmitting transducer is cross-polarized with respect to the first transmitting transducer. In the alternative, the third transducer may be employed to receive shear acoustic energy along with the second receiving transducer. In this alternative, the third receiving transducer is cross-polarized with respect to the second receiving transducer.

In a still further aspect, both third and fourth transducers may be employed, a third transducer for transmitting shear acoustic energy and a fourth transducer for receiving shear acoustic energy. In this embodiment, both the third transmitting transducer and fourth receiving transducers are cross-polarized with respect to the first transmitting transducer and the second receiving transducer, respectively.

The measured amplitude of the received shear acoustic energy is utilized to determine a pair of perpendicular azimuthal directions for which such amplitude is at a minimum. The measured phase of the received shear acoustic energy is utilized to determine a first quadrant between the pair of perpendicular azimuthal directions for which the transmitted and cross-polarized received shear acoustic energies are in-phase and also a second quadrant between the pair of perpendicular azimuthal directions for which the transmitted and cross-polarized received shear acoustic energies are out-of-phase. The azimuthal direction of the mechanical anisotropy of the material is identified from the relationship of the pair of perpendicular azimuthal directions and such first and second quadrants.

DESCRIPTION OF THE PREFERRED EMBODIMENT

Figure 1:
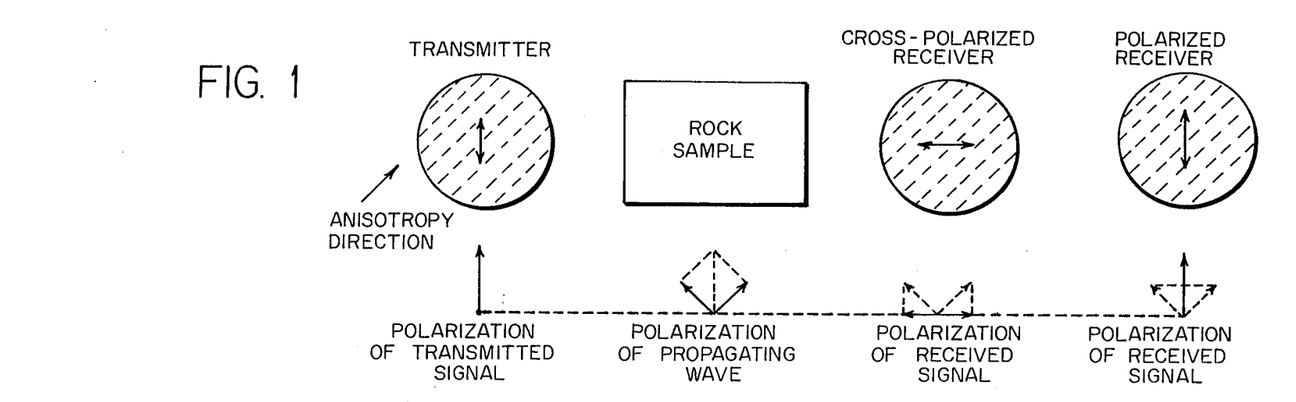
FIGS. 1-3 illustrate shear acoustic energy propagation through a mechanically anisotropic material.
Figure 2:
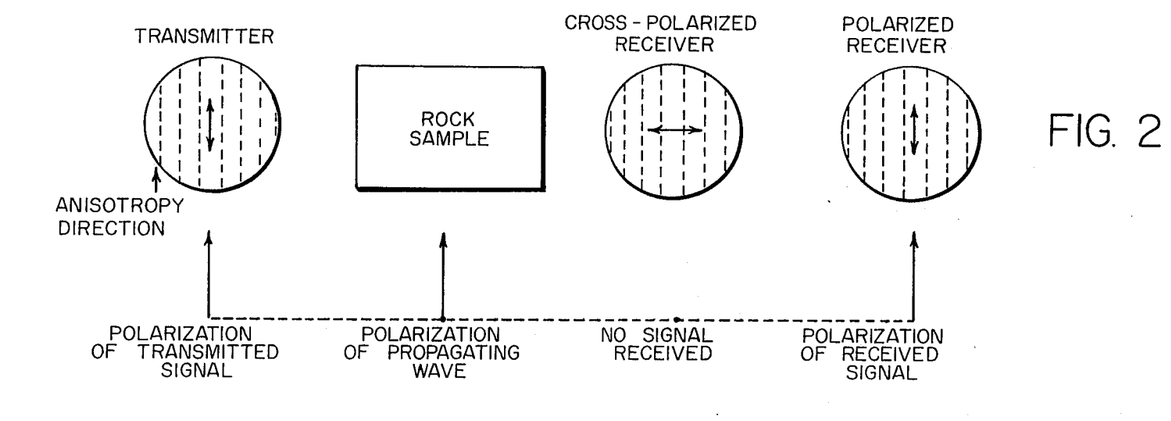
Figure 3:
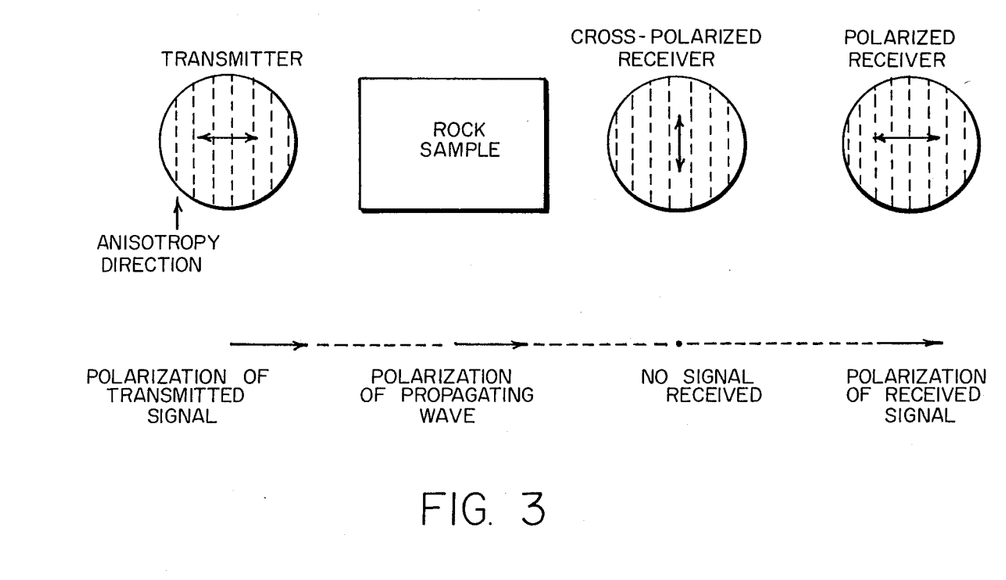

Cross-polarized shear wave transducers, or cross-polarized point force type transducers, are used, alone or in combination with polarized shear wave transducers, to detect mechanical anisotropy and to determine its azimuthal direction, particularly in subsurface rock formations or in core samples from such rock formations. FIG. 1 illustrates what happens to a polarized shear wave which enters an anisotropic material. The shear acoustic energy is split into two polarized shear waves whose polarizations are parallel and perpendicular to the direction of anisotropy. When this shear acoustic energy is received by a shear wave transducer whose polarization is 90° from, or perpendicular to, the polarization of the transmitting shear wave transducer (i.e., cross-polarized), only that shear acoustic energy with a component of motion in the direction of the polarization of the receiving transducer will be received. However, if the direction of polarization of the transmitting transducer is parallel (FIG. 2) or perpendicular (FIG. 3) to the direction of anisotropy, then the transmitted shear wave will not be repolarized upon entering the propagating medium (i.e., rock sample). It is already polarized in one of the two acceptable directions. Therefore, the shear wave impinging the cross-polarized receiving transducer will have no component of motion in the direction of polarization of such receiving transducer and no shear acoustic energy is received since the receiving transducer is not excited. Also shown in FIGS. 1-3 are the polarizations of shear acoustic energy received by a transducer with polarization parallel to that of the transmitting transducer as might be used in addition to the cross-polarized transducers.

Figure 4:
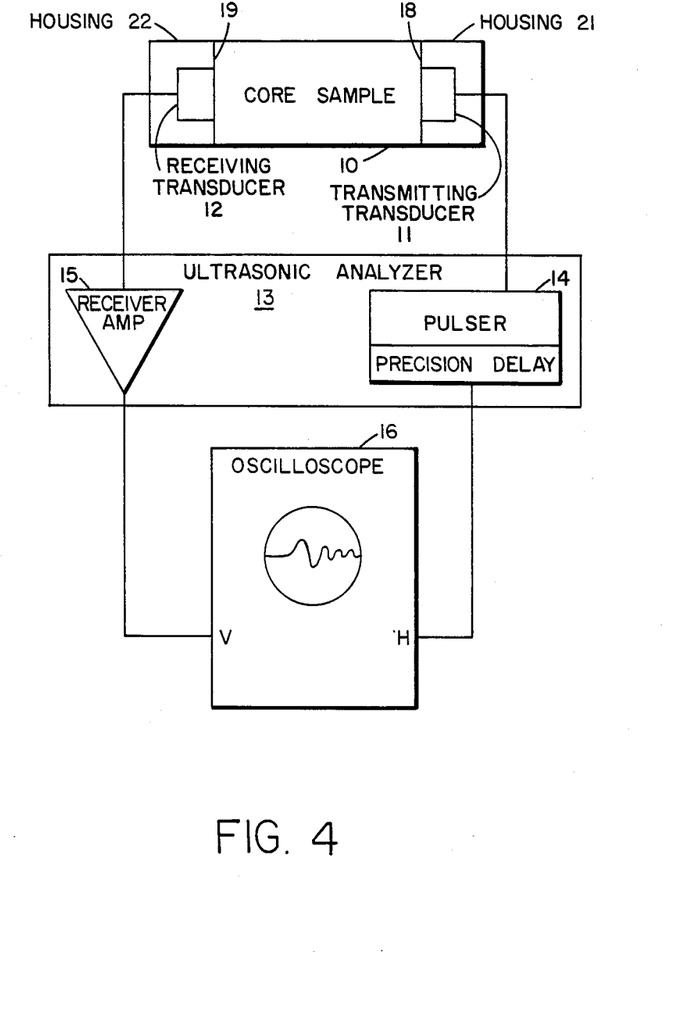
FIG. 4 illustrates a system for determining the shear acoustic energy propagation of FIGS. 1-3 through a core sample of a subterranean formation as a measure of the mechanical anisotropy of such core sample.
Figure 5A:
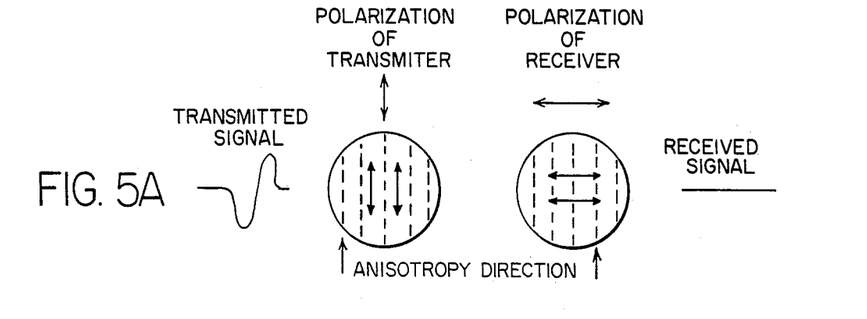
FIG. 5 illustrates the amplitude and phase relationships of the transmitted and received shear acoustic energies when the transmitting and receiving transducers in FIG. 4 are cross-polarized in accordance with the present invention.
Figure 5B:
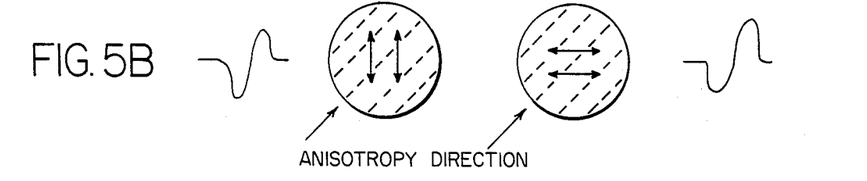
Figure 5C:
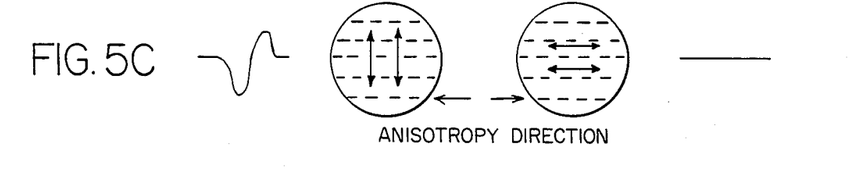
Figure 5D:
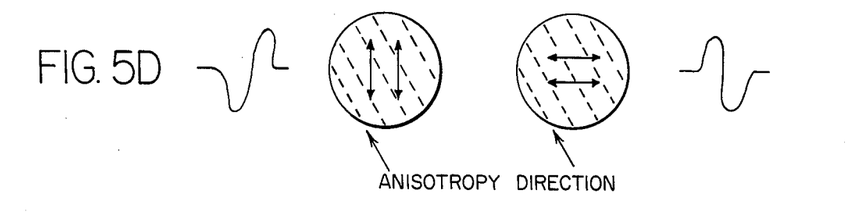

To measure the azimuthal direction of the mechanical anisotropy of a core sample, for example, a pair of planar shear transducers are positioned against opposing planar surfaces, as shown in FIG. 4. While maintaining the polarizations of the transducers perpendicular to one another, either the core sample or the transducers are rotated through a plurality of azimuthal directions. The azimuthal direction at which the shear acoustic energy goes to a minimum at the cross-polarized receiving transducer will be either parallel or perpendicular to the mechanical anisotropy direction, as shown in FIGS. 5A and 5C. Also, from FIGS. 5B and 5D, it can be seen that examination of the azimuthal quadrants, which have received shear acoustic energy in-phase or out-of-phase with respect to the transmitted shear acoustic energy, determines the exact mechanical anisotropy direction. Rotation of the shear acoustic energy in one direction yields the in-phase received signal of FIG. 5B, while rotation in the opposite direction yields the out-of-phase received signal of FIG. 5D.

In a further aspect of the invention, additional transducers may be employed to reduce the number of azimuthal directions that would otherwise need to be made when using a single pair of transducers (i.e. one transmitting and one receiving) to give a good estimate of the mechanical anisotropy directions. For example, an additional transmitting transducer which is cross-polarized with respect to the first transmitting transducer and polarized with respect to the receiving transducer can be utilized. In the alternative, an additional receiving transducer which is cross-polarized with respect to the first receiving transducer and polarized with respect to the transmitting transducer may be utilized. Still further, both such additional transmitting and receiving transducers may be utilized.

Referring again to FIG. 4, the core sample 10 from a subterranean formation to be examined in accordance with the present invention is mounted between a transmitting transducer 11 and its housing 21 and a receiving transducer 12 and its housing 22. These transducers are acoustic energy devices, such as piezoelectric or magnetostrictive crystals, designed to transmit and receive shear acoustic energy signals. Generation of the acoustic signal is carried out by the analyzer 13 including a pulser section 14 and a receiver section 15. The pulser section 14 produces an electrical pulse to excite the transmitting transducer 11, causing it to emit an acoustic pulse. This pulse travels through the material of core sample 10 and is converted by the receiving transducer 12 into an electrical signal which is applied to and conditioned by the receiver section 15 of the analyzer 13. This technique is called the "through transmission" technique as the pulse is transmitted by one transducer and received by another. An alternate embodiment might employ the "pulse-echo" technique whereby the pulse travels from the transducer through the material until it is reflected from an interface, such as the other end of the core sample. The reflected pulse may be received by the same transducer, or an additional transducer, and converted into an electrical signal.

In either embodiment, the electrical signal, after being conditioned by the receiver section 15 of the analyzer 13, may be displayed on an oscilloscope 16 for visual interpretation and travel time calculation. The signal may also be recorded by other suitable devices, such as a Tektronix model 7219AD digital waveform recorder or a strip chart recorder, for analysis.

The analyzer 13 may be a Panametrics, Inc. Model 5055PR, which combines a pulser/receiver in a single unit. The oscilloscope 16 may be a Hewlett-Packard 1743A model, which provides a dual time base with suitable time and amplitude expansion for an accurate selection of the acoustic time break.

The core sample is shaped to provide a pair of planar outer surfaces 18 and 19 along parallel spaced-apart planes through the core sample such that the perpendicular between such surfaces 18 and 19 corresponds to the vertical orientation of the core sample prior to being taken from the subterranean formation. The core sample does not have to be a right circular cylinder or a regular prism shape. Only the two surfaces 18 and 19 need to be planar and parallel.

Polarized shear acoustic energy is transmitted and received between the surfaces 18 and 19 of the core sample 10 by commercial, planar shear transducers 11 and 12, respectively, such as Panametrics Model V152. The transducers 11 and 12 are axially aligned and rotationally cross-polarized with respect to one another. Such polarized wave motion is detected by the receiving transducer to the exclusion of any other wave motion.

To achieve such an azimuthal direction change in the shear acoustic energy transmission pattern, the transducers 11 and 12 are simultaneously rotated so that the orientation of the polarized shear energy impinging upon and received by the transducers moves in azimuthal direction with respect to the core sample about the perpendicular between the two outer planar surfaces of the core sample, such perpendicular corresponding to the vertical orientation of the core sample before being taken from the subterranean formation. During such rotation, the transducers continue to be positioned in the same locations on the outer surfaces 18 and 19. In the alternative, the core sample can be rotated while holding the transducers fixed in position.

In carrying out such measurements, the transducers 11 and 12 are held rigid and pressed against the outer surfaces 18 and 19 of the core sample. To ensure good contact, a simple press is utilized to provide a fixed pressure. One such press that has been successfully employed is described and illustrated in detail in U.S. Pat. No. 4,380,930 to Podhrasky and Sprunt, such U.S. patent being specifically incorporated herein by reference.

Figure 6:
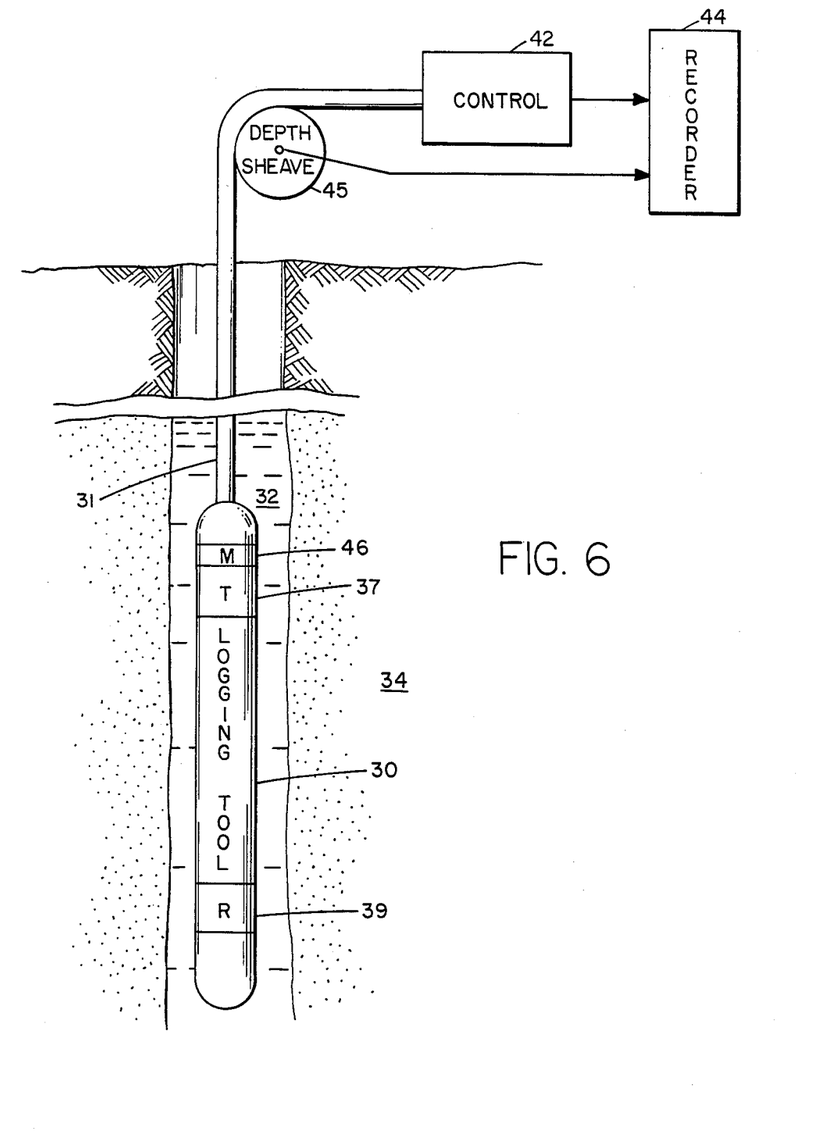
FIG. 6 illustrats an alternative system for determining the shear acoustic energy propagation of FIGS. 1-3 through a subterranean formation surrounding a borehole as a measure of the mechanical anisotropy of such formation.

Alternatively to the embodiment of FIG. 4 for making mechanical anisotropy measurements on a core sample, such as from a subterranean formation, the embodiment of FIG. 6 may be used to measure such mechanical anisotropy in-situ of the subterranean formation. In this embodiment, an elongated logging tool 30 is suspended from a cable 31 within a borehole 32 which traverses a subterranean formation of interest 34. Formation 34 may be a suspected oil or gas bearing formation which is to be characterized in regard to its porosity, fluid saturation, or such other information as may be desired. The well 32 is filled with a liquid, such as drilling mud. The logging tool 30 comprises an acoustic shear transmitter section 37 and acoustic shear receiver sections 19 and 20. Transmitter section 37 contains a rotating point force type of transducer. Receiver section 39 contains a point force type shear wave acoustic energy transducer which is synchronously rotated with the transmitter and remains cross-polarized with respect to said transmitter. A vector type magnetometer 46 is rotated synchronously with the transmitter and receivers. Signals from the logging tool 30 are transmitted uphole by the conductors in cable 31 to any suitable utilization system at the surface. For example, the utilization system is illustrated as comprising an uphole control circuit 42 and recorder 44 and a depth measuring sheave 45 in order that the output from circuit 42 may be correlated with depth. The transmitter and receiver sections are controlled through suitable timing circuitry located either uphole or in the logging tool itself. Typically, the control circuitry 42 will comprise a time base generator which operates to produce pulses to excite the transducers of transmitter section 37 and to gate the transducers of receiver section 39. In a preferred embodiment, the transducers are of the bender bar type.

As transmitters, such transducers generally attempt to achieve a single point force application of acoustic energy to the borehole wall. The theory behind point force transmitters, as generally outlined in "A New Method of Shear-Wave Logging", *Geophysics*, Vol. 45, No. 10 (Oct. 1980), pp. 1489-1506, by Choro Kitsunezaki, is that they are capable of directly generating shear waves. Conventional multi-directional transmitters are said to be capable only of indirectly creating shear waves. Point force type transmitters produce shear waves of substantially higher amplitudes than heretofore possible with conventional multi-directional compressional wave transmitters, thus providing better data for determining velocity and attenuation. Also, such transmitters excite shear waves with azimuthally polarized particle motion. Such azimuthally oriented patterns are obviously necessary in shear wave anisotropy logging since the changes with azimuth are required to determine anisotropy. In addition, formations, such as loosely consolidated or unconsolidated sand, which do not convert compressional waves to shear waves, or in which the shear waves excited are not of sufficient amplitudes to permit definitive detection using conventional compression wave transmitters and receivers, may now be shear wave logged with these shear wave transmitters and receivers. Canadian Patent No. 1,152,201 to Angona and Zemanek, Jr., describes a shear wave acoustic logging system employing such a point force transducer for shear wave transmission and reception, such Canadian patent being specifically incorporated herein by reference.

In order to utilize the logging system of FIG. 6 to identify any mechanical anisotropy characteristic of the formation surrounding the borehole, it is necessary that the shear acoustic energy amplitudes and phases be measured and compared through a plurality of differing azimuthal polarizations about the borehole. To provide such plurality of polarizations, the transmitter section 37 employs at least one rotating shear wave energy transmitter focused so as to alternately generate polarized shear waves whose particle motions are spaced apart in an azimuthal direction about the axis of the logging tool.

To receive this shear acoustic energy, transmission receiver section 39 is rotationally positioned, or focused, in cross-polarized synchronism with the transmitter section 37 about the logging tool axis.

Alternatively to utilizing a plurality of rotating transducers at the transmitting and receiving sections of the logging tool, a plurality of fixed transducers at each section may be employed to sequentially transmit and receive shear acoustic energy in a plurality of directions around the borehole.

Having now described and illustrated preferred embodiments of the invention, it is to be understood that various modifications or alterations may be made without departing from the spirit and scope of the invention as set forth in the appended claims.

I claim:

1. A method for determining the azimuthal direction of the mechanical anisotropy of a material, comprising the steps of:
    (a) transmitting polarized shear acoustic energy through said material with a polarized transmitting shear transducer, said acoustic energy being repolarized within said material into a pair of shear waves of differing polarizations, a first of said shear waves having a plarization parallel to the azimuthal direction of the mechanical anisotropy of the material and a second of said shear waves having a plarization perpendicular to the azimuthal direction of the mechanical anisotropy of the material;
    (b) receiving polarized shear acoustic energy which has traveled through said material with a polarized receiving shear transducer which is cross-polarized with respect to said transmitting shear transducer,
    (c) synchronously rotating the azimuthal direction of said shear acoustic energy transducers with respect to said material, and
    (d) measuring the amplitudes and phases of both the transmitted and received shear acoustic energies as a functioned of the azimuthal rotation of said transmitting and receiving shear acoustic energy transducers,
    (e) comparing the phase of said cross-polarized received shear acoustic energy with the phase of the transmitted shear acoustic energy as a function of the azimuthal rotation of said shear acoustic energy transducers,
    (f) detecting the pair of perpendicular azimuthal directions for which the amplitude of the cross-polarized received shear acoustic energy is at a minimum,
    (g) detecting at least a first quadrant between said pair of perpendicular azimuthal directions for which said transmitted and cross-polarized received shear waves are in-phase with respect to one another,
    (h) detecting at least a second quadrant between said pair of perpendicular azimuthal directions in which said transmitted and cross-polarized received shear acoustic energies are out-of-phase with respect to one another, and
    (i) identifying the azimuthal direction of the mechanical anisotropy of said material from the relationship of said pair of perpendicular azimuthal directions and said first and second quadrants.

2. The method of claim 1 wherein:
    (a) said first quadrant is identified as that quadrant in which said cross-polarized received shear acoustic energy is in-phase with said transmitted shear acoustic energy after it has been transmitted in a first rotational direction through said material, and
    (b) said second quadrant is identified as that quadrant in which said cross-polarized received shear acoustic energy is out-of-phase with said transmitted shear acoustic energy after it has been transmitted in a second rotational direction through said material that is opposite to said first rotational direction.

3. The method of claim 1 wherein the azimuthal direction of the mechanical anisotropy of said material is identified as that one of said detected perpendicular azimuthal directions for which said transmitted and cross-polarized received shear acoustic energies are in-phase for a first rotational direction of said shear acoustic energy with respect to said one of said detected perpendicular azimuthal directions through said material and are out-of-phase for a second rotational direction of said shear acoustic energy with respect to said one of said detected perpendicular azimuthal directions through said material.

4. The method as in any one of claims 1-3 in which said steps of transmitting and receiving shear acoustic energy are carried out from at least one planar surface on said material.

5. The method of claim 4 wherein said steps of transmitting and receiving shear acoustic energy are carried out across a pair of parallel planar surfaces on said material.

6. The method of claim 5 wherein said material is a core sample taken from a subterranean formation.

7. The method as in any one of claims 1-3 in which said material comprises a portion of a subterranean formation surrounding a borehole and said steps of transmitting and receiving shear acoustic energy are carried out within said borehole.

8. Apparatus for determining the azimuthal direction of the mechanical anisotropy of an internal of a subterranean formation along a borehole comprising:
    (a) a first transducer for transmitting shear acoustic energy through said material, and
    (b) a second transducer located at a spaced-apart axial position from said first transducer within a borehole logging tool for receiving shear acoustic energy that has traveled through said substerranean formation interval, said second transducer being cross-polarized with respect to said first transducer,
    (c) means for providing relative synchronously rotational movement of said first and second transducers with respect to said subterranean formation interval,
    (d) means for measuring the amplitude of cross-polarized shear acoustic energy received by said second transducer as a function of the azimuthal rotation of said shear acoustic energy transducers,
    (e) means for measuring the phase of said cross-polarized received shear acoustic energy with respect to the transmitted shear acoustic energy as a function of the azimuthal rotation of said shear acoustic energy transducers, and
    (f) means for identifying the azimuthal direction of the mechanical anisotropy of said subterranean formation interval from the measured amplitude and phase of said cross-polarized received shear acoustic energy.

9. A system for determining the mechanical anisotropy of a subterranean formation surrounding a borehole, comprising:
    (a) a borehole logging tool,
    (b) a first transducer located within said logging tool for transmitting shear acoustic energy into the formations surrounding said borehole,
    (c) a second transducer axially positioned at a spaced-apart position from said first transducer within said logging tool for receiving shear acoustic energy that has traveled through the formation surrounding said borehole between said first and second transducers, said second transducer being oriented so that it is cross-polarized with respect to said first transducer,
    (d) means for rotating the azimuthal direction of said transmitted shear acoustic energy through said formations,
    (e) means for measuring the amplitude of the received shear acoustic energy as a function of said azimuthal direction,
    (f) means for measuring the phase of the received shear acoustic energy with respect to the transmitted shear acoustic energy as a function of said azimuthal direction, and
    (g) means for determining the azimuthal direction of the mechanical anisotropy of the subterranean formation surrounding said borehole from said amplitude and phase measurements.

10. The system of claim 9 further comprising a third transducer located within said logging tool for transmitting shear acoustic energy into the formations surrounding said borehole along with the shear acoustic energy transmitted by said first transducer, said third transducer being cross-polarized with respect to said first transducer and polarized with respect to said second transducer.

11. The system of claim 10 further comprising a third transducer located within said logging tool for receiving shear acoustic energy along with said second transducer that has traveled through the formation surrounding said borehole from said first transducer, said third transducer being cross-polarized with respect to said second transducer and polarized with respect to said first transducer.

12. The system of claim 11 further comprising a fourth transducer located within said logging tool for transmitting shear acoustic energy into the formations surrounding said borehole along with the shear acoustic energy transmitted by said first transducer, said fourth transducer being cross-polarized with respect to said second and third transducers and polarized with respect to said first transducer.

* * * * *

UNITED STATES PATENT AND TRADEMARK OFFICE
CERTIFICATE OF CORRECTION

PATENT NO. : 4,713,968

DATED : December 22, 1987

INVENTOR(S) : David P. Yale

It is certified that error appears in the above-identified patent and that said Letters Patent is hereby corrected as shown below:

Column 6, line 17, (Claim 1), "plarization" should read --polarization--.

Column 6, line 20, (Claim 1), "Plarization" should read --polarization--.

Column 6, line 32, (Claim 1), "functioned" should read --function--.

Column 7, line 36, (Claim 8), "substerranean" should read --subterranean--

Column 7, line 29, (Claim 8), "internal" should read --interval--.

Column 8, line 40, (Claim 11), "claim 10" should read --claim 9--.

Signed and Sealed this

Ninth Day of August, 1988

Attest:

DONALD J. QUIGG

*Attesting Officer*                *Commissioner of Patents and Trademarks*